US012795328B2

(12) United States Patent
Timonen et al.

(10) Patent No.: US 12,795,328 B2
(45) Date of Patent: Nov. 10, 2026

(54) LOCATION AND SPACE AWARE ADAPTIVE SYNCHRONIZATION

(71) Applicant: Varjo Technologies Oy, Helsinki (FI)

(72) Inventors: Ville Timonen, Helsinki (FI); Mika-Petteri Lundgren, Salo (FI)

(73) Assignee: Varjo Technologies Oy, Helsinki (FI)

( * ) Notice: Subject to any disclaimer, the term of this patent is extended or adjusted under 35 U.S.C. 154(b) by 512 days.

(21) Appl. No.: 17/720,545

(22) Filed: Apr. 14, 2022

(65) Prior Publication Data

US 2023/0336944 A1 Oct. 19, 2023

(51) Int. Cl.

| | |
|---|---|
| ***H04W 4/02*** | (2018.01) |
| ***G01V 8/20*** | (2006.01) |
| ***H04W 4/029*** | (2018.01) |
| ***H04W 4/38*** | (2018.01) |
| ***H04W 56/00*** | (2009.01) |

(52) U.S. Cl.

CPC .............. *H04W 4/026* (2013.01); *G01V 8/20* (2013.01); *H04W 4/023* (2013.01); *H04W 4/029* (2018.02); *H04W 4/38* (2018.02); *H04W 56/001* (2013.01)

(58) Field of Classification Search

CPC ..... H04W 4/026; H04W 4/023; H04W 4/029; H04W 4/38; H04W 56/001; G01V 8/20; G01S 5/02585; G01S 17/86; G01S 17/87; G01S 5/0295; G01S 5/163

See application file for complete search history.

(56) References Cited

U.S. PATENT DOCUMENTS

| | | | | |
|---|---|---|---|---|
| 2003/0097195 | A1* | 5/2003 | Yamrom | G06T 19/20 700/95 |
| 2006/0012521 | A1 | 1/2006 | Small | |
| 2013/0237811 | A1* | 9/2013 | Mihailescu | G01S 15/899 600/407 |
| 2015/0168538 | A1* | 6/2015 | Bradley | G01S 5/18 367/127 |
| 2016/0299607 | A1* | 10/2016 | Lipman | G06F 3/0488 |
| 2017/0265155 | A1* | 9/2017 | Kim | H04L 27/2692 |
| 2019/0113966 | A1* | 4/2019 | Connellan | G01S 5/16 |
| 2021/0314910 | A1* | 10/2021 | Rune | H04L 5/0094 |

FOREIGN PATENT DOCUMENTS

WO 2012028827 A1 3/2012

OTHER PUBLICATIONS

European Patent Office, Extended European Search Report, Application No. 23162007.1, Mailed Aug. 14, 2023, 8 pages.

* cited by examiner

*Primary Examiner* — Margaret G Webb

(74) *Attorney, Agent, or Firm* — ZIEGLER IP LAW GROUP, LLC.

(57) ABSTRACT

Disclosed is a computer-implemented method comprising: tracking positions and orientations of devices (104, 106, 204*a*-204*f*, A-F, 402, 404) within real-world environment (300), each device comprising active sensor(s) (108, 110, 206*a*-206*f*); classifying devices into groups, based on positions and orientations of devices within real-world environment, wherein a group has devices whose active sensors are likely to interfere with each other; and controlling active sensors of devices in the group to operate by employing multiplexing.

12 Claims, 4 Drawing Sheets

LOCATION AND SPACE AWARE ADAPTIVE SYNCHRONIZATION

TECHNICAL FIELD

The present disclosure relates to computer-implemented methods for location and space aware adaptive synchronization. The present disclosure also relates to systems for location and space aware adaptive synchronization.

BACKGROUND

In recent times, there has been an ever-increasing demand for developing interactive visual content, for example, such as immersive extended-reality (XR) environments, which are being employed in various fields such as entertainment, real estate, training, medical imaging operations, simulators, navigation, and the like. Notably, for developing the interactive visual content, multiple active sensors (for example, such as infrared sensors, time-of-flight (ToF) sensors, structured-light sensors or similar) employed in a given real-world environment are required to be synchronised with each other.

However, existing technologies for synchronizing active sensors are associated with several limitations. The existing technologies are not well-suited for accurately synchronizing the active sensors, as these active sensors are prone to interfering with each other when they are active in a same region of the real-world environment. Resultantly, the active sensors do not perform consistently and coherently, for example, when collecting active sensor data from the same region of the real-world environment. Thus, processing of such data becomes cumbersome and error-prone. Moreover, the active sensor data may get corrupted and become unusable.

Furthermore, some existing technologies employ multiplexing of active sensors present in proximity to each other. However, in such a case, all the active sensors are multiplexed with respect to each other. Resultantly, multiplexing of each extra active sensor lowers the performance (such as in terms of frame rate) for all the active sensors. For example, consider a case where there are 20 active sensors in proximity to each other, and each of these active sensors is capable of operating at 60 Hertz at its full capacity. In such a case, if these active sensors were to operate with multiplexing, each active sensor would get a framerate of 3 Hertz only, irrespective of whether or not all of these active sensors interfere with each other. Such low performance functioning of the active sensors may result in a non-immersive collaboration of the active sensor data collected by these active sensors.

Therefore, in light of the foregoing discussion, there exists a need to overcome the aforementioned drawbacks associated with existing technologies for synchronizing active sensors of multiple devices.

SUMMARY

The present disclosure seeks to provide a computer-implemented method for location and space aware adaptive synchronization. The present disclosure also seeks to provide a system for location and space aware adaptive synchronization. An aim of the present disclosure is to provide a solution that overcomes at least partially the problems encountered in prior art.

In one aspect, an embodiment of the present disclosure provides a computer-implemented method comprising:

tracking positions and orientations of a plurality of devices within a real-world environment, each device comprising at least one active sensor;

classifying the plurality of devices into a plurality of groups, based on the positions and the orientations of the plurality of devices within the real-world environment, wherein a given group has devices whose active sensors are likely to interfere with each other; and controlling the active sensors of the devices in the given group to operate by employing multiplexing.

In another aspect, an embodiment of the present disclosure provides a system comprising at least one server that is communicably coupled to a plurality of devices, each device comprising at least one active sensor, wherein the at least one server is configured to:

obtain information indicative of positions and orientations of the plurality of devices within a real-world environment;

classify the plurality of devices into a plurality of groups, based on the positions and the orientations of the plurality of devices within the real-world environment, wherein a given group has devices whose active sensors are likely to interfere with each other; and send instructions to at least one of the devices in the given group to control the active sensors of the devices to operate by employing multiplexing.

Embodiments of the present disclosure substantially eliminate or at least partially address the aforementioned problems in the prior art, and enable efficient, accurate, location and space aware adaptive synchronization of active sensors in real time or near-real time, by way of employing multiplexing.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
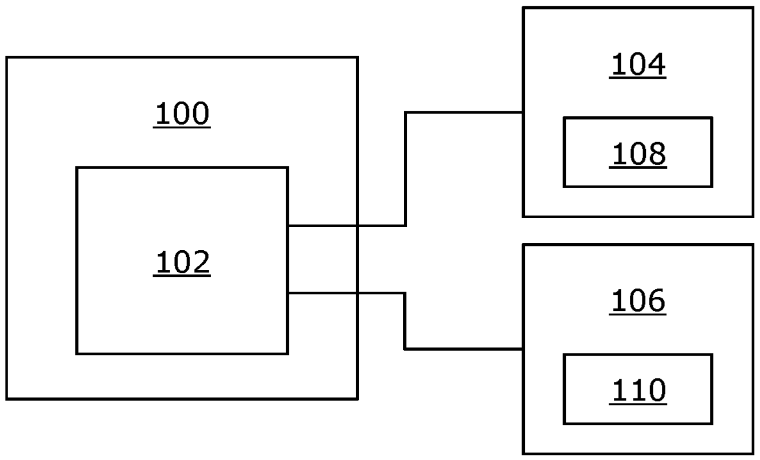
FIGS. 1 and 2 illustrate block diagrams of architectures of a system for location and space aware adaptive synchronization, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a computer-implemented method comprising:

- tracking positions and orientations of a plurality of devices within a real-world environment, each device comprising at least one active sensor;
- classifying the plurality of devices into a plurality of groups, based on the positions and the orientations of the plurality of devices within the real-world environment, wherein a given group has devices whose active sensors are likely to interfere with each other; and
- controlling the active sensors of the devices in the given group to operate by employing multiplexing.

In another aspect, an embodiment of the present disclosure provides a system comprising at least one server that is communicably coupled to a plurality of devices, each device comprising at least one active sensor, wherein the at least one server is configured to:

- obtain information indicative of positions and orientations of the plurality of devices within a real-world environment;
- classify the plurality of devices into a plurality of groups, based on the positions and the orientations of the plurality of devices within the real-world environment, wherein a given group has devices whose active sensors are likely to interfere with each other; and
- send instructions to at least one of the devices in the given group to control the active sensors of the devices to operate by employing multiplexing.

The present disclosure provides the aforementioned computer-implemented method and the aforementioned system for location and space aware adaptive synchronization of active sensors. Herein, the computer-implemented method enables grouping the devices whose active sensors are likely to interfere with each other (based on the positions and the orientations of the plurality of devices), so that only active sensors of those devices are subsequently controlled to operate by employing the multiplexing, rather than controlling active sensors of all the devices to operate by employing the multiplexing. Active sensors of devices that are unlikely to interfere with each other are not required to be controlled to operate by employing multiplexing with respect to each other. Beneficially, such a manner of selectively controlling the active sensors of the devices in a same group to operate by employing the multiplexing facilitates in real time, dynamic, scalable synchronization of the active sensors (without any interference). This may, for example, results in a realistic and immersive collaboration of users using the plurality of devices. The system is simple and robust. The computer-implemented method is fast, effective, reliable and can be implemented with ease.

Optionally, the computer-implemented method is implemented by the at least one server. In an example, the at least one server may employ Precision Time Protocol (PTP) for the aforesaid implementation. Additionally or alternatively, optionally, the computer-implemented method is implemented by the plurality of devices. In an example, the plurality of devices may employ peer-to-peer (P2P) computing, timers of Bluetooth® hardware, and the like, for the aforesaid implementation, as described later.

Throughout the present disclosure, the term "server" refers to hardware, software, firmware or a combination of these that provides functionality by way of resources, data, services or programs to the plurality of devices, for enabling location and space aware adaptive synchronization. Optionally, the at least one server is implemented as a cloud server. Optionally, the system further comprises a data repository that is communicably coupled to the at least one server. Optionally, the at least one server is configured to store, at the data repository, information indicative of classification of the plurality of devices into the plurality of groups and the information indicative of the positions and the orientations of the plurality of devices. The data repository may be implemented as a memory of the at least one server, a cloud-based database, or similar.

One or more of the plurality of devices could be arranged at fixed locations within the real-world environment. Optionally, in such a case, such devices are stationary in the real-world environment. Additionally or alternatively, one or more other of the plurality of devices could be wearable devices being worn by users present in the real-world environment. In such a case, the location of such a device changes with a change in a location of its user. Likewise, one or more of the plurality of devices could be arranged on, for example, drones, robots, or similar. As an example, a given device could be arranged on a support structure and is capable of a three-dimensional (3D) rotation (and additionally, capable of a translation motion). The support structure can be moved to any required location in the real-world environment.

It will be appreciated that the plurality of devices could comprise different types of devices present within the real-world environment. Some devices could be stationary in the real-world environment, while other devices could be movable in the real-world environment. In an example, the plurality of devices may comprise head-mounted display (HMD) devices, teleport devices, and the like. The term "head-mounted display" refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

Optionally, the at least one server is configured to obtain the information indicative of the positions and the orientations of the plurality of devices from a computing device that is communicably coupled to pose-tracking means. Optionally, in this regard, the computing device is configured to: process pose-tracking data, collected by the pose-tracking means, to determine the positions and the orientations of the plurality of devices; and send, to the at least one server, the information indicative of the positions and the orientations of the plurality of devices. It will be appreciated that the at least one server is communicably coupled to the computing device. Examples of the computing device include, but are not limited to, a computer and a laptop.

Additionally or alternatively, optionally, the at least one server is configured to obtain information indicative of a position and an orientation of a given device (from amongst the plurality of devices) from the given device itself. Optionally, in this regard, the given device comprises pose-tracking means. Optionally, a processor of the given device is configured to: process pose-tracking data, collected by the pose-tracking means of the given device, to determine the position and the orientation of the given device; and send, to the at least one server, the information indicative of the position and the orientation of the given device.

The term "pose-tracking means" refers to a specialized equipment that is employed to detect and/or follow a position and an orientation of a given device from amongst the plurality of devices (in real time or near-real time). Pursuant to embodiments of the present disclosure, the pose-tracking means is implemented as a true six Degrees of Freedom (6 DoF) tracking system that tracks translational movements (namely, surge, heave and sway movements) and rotational movements (namely, roll, pitch and yaw movements) of the given device within a 3D space of the real-world environment.

The pose-tracking means may employ an outside-in tracking technique, an inside-out tracking technique, or a combination of both the aforesaid techniques, for collecting the pose-tracking data. Such techniques are well-known in the art. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader.

Optionally, the computing device and/or the processor of the given device employ(s) at least one data processing algorithm to process the pose-tracking data. The pose-tracking data may be in form of images, IMU/TIMU values, motion sensor data values, magnetic field strength values, or similar. Correspondingly, requisite data processing algorithm(s) is/are employed to process the pose-tracking data, to determine the position and the orientation of the given device. Examples of the at least one data processing algorithm include a feature detection algorithm, an environment mapping algorithm, a pose data extrapolation algorithm, and the like.

Optionally, the positions and the orientations of the plurality of devices are represented in a global coordinate space. The term "global coordinate space" refers to a 3D space of the real-world environment that is represented by a global coordinate system. The global coordinate system defines a position and an orientation within the 3D space of the real-world environment. Optionally, the global coordinate system has a predefined origin and three mutually perpendicular coordinate axes. The three mutually perpendicular coordinate axes could be, for example, X, Y, and Z axes. In an example, the position in the global coordinate system may be expressed as (x, y, z) position coordinates along the X, Y and Z axes, respectively.

Throughout the present disclosure, the term "active sensor" refers to an equipment that is operable to at least sense and/or detect reflections of signals (for example, such as a light pattern, infrared light, sound or the like) off the real-world environment. It will be appreciated that a given active sensor may also project (namely, emit) the signals to illuminate the real-world environment, in addition to sensing and/or detecting the reflections of the signals. The at least one active sensor may be an infrared (IR)-light sensor, a Red-Green-Blue-Depth (RGB-D) sensor, a Light Detection and Ranging (LiDAR) sensor, a Time-of-Flight (ToF) sensor, a Sound Navigation and Ranging (SONAR) sensor, a structured-light sensor, a hyperspectral-light sensor, or similar. A given active sensor is optionally arranged on a given device. It will be appreciated that a given device may comprise different types of active sensors.

Notably, since the positions and the orientations of the plurality of devices are known to the at least one server, the at least one server can accurately determine which devices (from amongst the plurality of devices) are in a vicinity of each other (i.e., close to each other) and are oriented in a same direction. Thus, the at least one server could classify such devices into the given group as active sensors of said devices are highly likely to interfere with each other. The technical benefit of grouping the devices in this manner is that only a requisite number of active sensors of the devices (that are likely to interfere with each other) are subsequently controlled to operate by employing the multiplexing, rather than controlling active sensors of all devices to operate by employing the multiplexing. Active sensors of devices that are unlikely to interfere with each other could be controlled to operate without employing the multiplexing. Such a manner of selectively controlling the active sensors of the devices to operate by employing the multiplexing or without the multiplexing, facilitates in real time, dynamic, scalable synchronization of the active sensors (without any interference). Resultantly, high active sensor refresh rates may be achieved, to experience an optimal and immersive collaboration of active sensor data collected by the active sensors.

In a first example, 6 devices A1, A2, A3, A4, A5, and A6 may be present within the real-world environment. Herein, the at least one server may classify: the devices A1 and A2 into a first group; the devices A3 and A4 into a second group; and the devices A5 and A6 into a third group.

Optionally, the computer-implemented method further comprises:

- monitoring radio packets transmitted by the plurality of devices; and
- for each device, determining at least one other device that is in a proximity of said device, based on monitoring of at least one radio packet transmitted by the at least one other device, wherein the plurality of devices are classified into the plurality of groups based also on a determination of which devices are in a proximity of each other.

Herein, the term "radio packet" refers to a stream of information that is carried by radio signals transmitted by a given device. A given radio packet comprises a unique identifier of the given device that transmitted it. It will be appreciated that when two or more devices are present in the real-world environment, unique identifiers are required to distinguish between the two or more devices. Optionally, the unique identifier is a string of at least one: alphabets, numerals, special characters, symbols.

Optionally, the radio packets comprise Bluetooth® advertising packets. Herein, the term "Bluetooth® advertising packet" refers to a radio packet which rely on Bluetooth® technology standard for transmitting and receiving the radio packet between the plurality of devices. The Bluetooth® technology standard may utilize an Out-of-Band (OOB) method of Secure Simple Pairing (SSP) for the aforesaid transmission and receiving. The Bluetooth® technology standard is well-known in the art. A given Bluetooth® advertising packet may be transmitted by the given device at a fixed time interval (namely, an advertising interval). A typical Bluetooth® advertising packet may contain a 16 bit header and a variable size payload.

Optionally, said monitoring of the radio packets comprises measuring a signal strength of a radio packet transmitted by a given device. When the plurality of devices are present within the real-world environment, each device measures signal strengths of radio packets transmitted by other devices. Higher the signal strength of a radio packet transmitted by other device, lesser is the distance between a given device and the other device. Optionally, the at least one server is configured to receive, from the given device, the measured signal strengths of the radio packets transmitted by the other devices for determining the at least one other device that is in the proximity of said device. Optionally, for the given device, when a signal strength of the at least one radio packet transmitted by the at least one other device exceeds a predefined threshold signal strength, the at least one other device is determined to be in the proximity of the given device. The predefined threshold signal strength may be either system defined, or user defined. It will be appreciated that the signal strength may be represented by a Received Signal Strength Indicator (RSSI) value.

Upon monitoring the radio packets transmitted by the plurality of devices, and determining which devices are in the proximity of each other, the at least one server can easily classify such devices into the plurality of groups as active sensors of said devices are likely to interfere with each other. In an example, 8 devices B1, B2, B3, B4, B5, B6, B7, and B8 may be present within the real-world environment. Herein, for the device B1, the devices B2, B4, and B7 are determined to be in a proximity of the device B1 (based on monitoring of radio packets transmitted by the devices B2-B8); thus, B1, B2, B4 and B7 are classified into a given group.

Notably, the active sensors of the devices in the given group are requisitely controlled to operate by employing the multiplexing in a manner that the active sensors of the devices do not interfere with each other. Herein, the term "multiplexing" refers to a process of interleaving by the active sensors of the devices in the given group in a manner that the active sensors of the devices are well-synchronized with each other, and do not interfere with each other. It will be appreciated that a type of multiplexing to be employed is selected (by the at least one server) based on a type of a given active sensor. Different types of multiplexing allows for real time, dynamic, and scalable synchronization between different types of active sensors. It will also be appreciated that the computer-implemented method may also employ a spread spectrum technology and a short integration time to further mitigate interference of the active sensors.

In an embodiment, the computer-implemented method further comprises:

obtaining a three-dimensional environment model of the real-world environment in which the plurality of devices are present;

determining, from the three-dimensional environment model, positions of optical barriers present in the real-world environment; and identifying a plurality of segments of the real-world environment that are optically separated from each other, based on the positions of the optical barriers, wherein devices in a given group are present in a corresponding segment of the real-world environment.

Optionally, the at least one server is configured to obtain the 3D environment model of the real-world environment from the data repository. In this regard, the 3D environment model is pre-stored at the data repository. Herein, the term "three-dimensional environment model" refers to a data structure that comprises comprehensive information pertaining to a 3D space of the real-world environment whereat the plurality of devices are present. Such a comprehensive information is indicative of at least one of: a plurality of features of objects or their portions present in the real-world environment, shapes and sizes of the objects or their portions, positions and orientations of the objects or their portions, colours of objects or their portions, light sources, lighting conditions within the real-world environment. Examples of the plurality of features include, but are not limited to, edges, corners, blobs and ridges. The object could be a living object (for example, such as a human, a pet, a plant, and the like) or a non-living object (for example, such as an optical barrier, a window, a toy, a poster, a lamp, and the like). The term "optical barrier" refers to a barrier that is optically non-transparent i.e., it does not allow light to pass therethrough. Examples of the optical barrier include, but are not limited to, a wall, a partition. It will be appreciated that the 3D environment model and the positions of the optical barriers are represented in the global coordinate space.

Optionally, the 3D model is in a form of at least one of: a 3D polygonal mesh, a 3D point cloud, a 3D surface cloud, a 3D surflet cloud, a voxel-based model, a mathematical 3D surface model, a parametric model, a 3D grid, a 3D hierarchical grid, a bounding volume hierarchy. The 3D polygonal mesh could be a 3D triangular mesh, a 3D quadrilateral mesh, and the like. The mathematical 3D surface model may be based on a plane, a sphere, a cylinder, a box, or similar. For example, the mathematical 3D surface model may be a Non-uniform rational basis spline (NURBS) model.

Since the 3D environment model includes the comprehensive information pertaining to the 3D space of the real-world environment, information pertaining to the positions of the optical barriers present in the real-world environment can be accurately known to the at least one server. This allows the at least one server to easily identify segments (namely, regions) of the real-world environment that are optically separated from each other (due to presence of the optical barriers). In this regard, the at least one server can subsequently and accurately identify which devices are present in which segments of the real-world environment, and active sensors of which devices could interfere with each other. Thus, by utilizing the aforesaid information, the at least one server can optimally (i.e., accurately) classify the plurality of devices into the plurality of groups and control the active sensors of the devices in a given group to operate by employing multiplexing. This is because active sensors of devices present in a given segment of the real-world environment are likely to interfere with each other, and do not interfere with active sensors of other devices present in remaining segment(s) of the real-world environment. A given group of devices whose active sensors are likely to interfere with each other corresponds to the given segment of the real-world environment (i.e., groups of devices correspond to respective segments of the real-world environment).

Referring to the first example, the devices A1 and A2 in the first group may be present in a first segment of the real-world environment, A3 and A4 in the second group may be present in a second segment of the real-world environment, and the devices A5 and A6 in the third group may be present in a third segment of the real-world environment.

Optionally, the computer-implemented method further comprises:

detecting, based on said tracking, when a given device has moved from a first segment to a second segment; and re-classifying the given device by shifting the given device from a first group to a second group, wherein the first group and the second group correspond to the first segment and the second segment, respectively.

In this regard, as the given device moves within the real-world environment (i.e., from the first segment to the second segment), position coordinates of the given device change. Since positions of the given device are tracked in real time or near-real time, and are already and accurately known to the at least one server, the at least one server can easily detect when the given device has moved from the first segment to the second segment.

When the given device moves from the first segment to the second segment, an active sensor of the given device no longer interferes with active sensor(s) of other device(s) present in the first segment corresponding to the first group, but the active sensor of the given device is now likely to interfere with active sensor(s) of other device(s) present in the second segment corresponding to the second group. Therefore, the given device is re-classified (by the at least one server) by shifting the given device from the first group to the second group. Beneficially, in this regard, the at least one server requisitely adjusts the multiplexing of the active sensors (namely, interleaving of the active sensors) of the devices in the aforesaid groups (on-the-fly) when there is a shifting of the given device from the first group to the second group.

Referring to and continuing the first example, the device A1 may move from the first segment to the second segment. In such a case, the device A1 is re-classified by shifting the device A1 from the first group to the second group. Upon such re-classification, the first group has the device A2 only, and the second group has the devices A1, A3 and A4.

In an additional or an alternative embodiment, the computer-implemented method further comprises:

detecting, based on the positions and the orientations of the plurality of devices, when fields of view of active sensors of at least two devices in a given group do not overlap; and controlling the active sensors of the at least two devices to operate without employing the multiplexing, when the fields of view of the active sensors of the at least two devices do not overlap.

In this regard, since the positions and the orientations of the plurality of devices are already known to the at least one server, the at least one server can accurately detect fields of view of active sensors of which devices in the given group overlap (i.e., when active sensors of the at least two devices are observing a common region of the real-world environment), and detect fields of view of active sensors of which devices in the given group do not overlap (i.e., when active sensors of the at least two devices are observing different regions of the real-world environment). It will be appreciated that when the fields of view of the active sensors of the at least two devices in the given group do not overlap, the active sensors of the at least two devices are not likely to interfere with each other. Therefore, the active sensors of the at least two devices could be controlled to operate without employing the multiplexing i.e., the active sensors of the at least two devices are allowed to operate at their full performance (without any restrictions/limitations).

Optionally, the computer-implemented method further comprises controlling the active sensors of the at least two devices to operate by employing the multiplexing, when the fields of view of the active sensors of the at least two devices overlap. This is because when the fields of view of the active sensors of the at least two devices in the given group overlap, the active sensors of the at least two devices are highly likely to interfere with each other, and therefore the multiplexing is employed.

Referring to and continuing the first example, fields of view of active sensors of the devices A5 and A6 in the third group may not overlap, whereas fields of view of active sensors of the devices A3 and A4 in the second group may overlap. In such a case, the active sensors of the devices A5 and A6 are controlled to operate without employing the multiplexing, whereas the active sensors of the devices A3 and A4 are controlled to operate by employing the multiplexing.

Optionally, the computer-implemented method further comprises:

detecting, based on the positions and the orientations of the plurality of devices, when the fields of view of the active sensors of the at least two devices in the given group do not overlap, but an angle between orientations of the active sensors of the at least two devices in the given group is smaller than a predefined threshold angle; and controlling the active sensors of the at least two devices to operate by employing the multiplexing, when the fields of view of the active sensors of the at least two devices in the given group do not overlap, but the angle between the orientations of the active sensors of the at least two devices is smaller than the predefined threshold angle.

Since the orientations of the plurality of devices are known to the at least one server, the angle between the orientations of the active sensors of the at least two devices in the given group can be accurately determined by the at least one server. Optionally, the predefined threshold angle lies in a range of 2 degrees to 45 degrees. As an example, the predefined threshold angle may be from 2, 5, 10 or 15 degrees up to 15, 20, 30 or 45 degrees. More optionally, the predefined threshold angle lies in a range of 2 degrees to 30 degrees. Yet more optionally, the predefined threshold angle lies in a range of 5 degrees to 20 degrees. The predefined threshold angle could be selected based on an angular extent of a field of view (namely, a frustum cone) of each device.

When the positions and orientations of the at least two devices in the given group is such that the fields of view of the active sensors of the at least two devices in the given group do not overlap, but the fields of view of the active sensors could overlap if any of the at least two devices turn towards each other by a certain angle, it could be anticipated that the active sensors of the at least two devices are likely to interfere with each other when the fields of view of the active sensors of the at least two devices would (eventually) overlap if any of the at least two devices turn towards each other. Therefore, the active sensors of the at least two devices are controlled to operate by employing the multiplexing (in advance). Beneficially, this facilitates in synchronizing the active sensors of the at least two devices when there is latency in a network between the at least one server and the at least two devices (that is, a reaction time of the at least one server is high), and this also takes care of quick head movements when the at least two devices are implemented as HMDs.

Optionally, the computer-implemented method further comprises controlling the active sensors of the at least two devices to operate without employing the multiplexing, when the fields of view of the active sensors of the at least two devices in the given group do not overlap, and the angle between the orientations of the active sensors of the at least two devices is greater than the predefined threshold angle.

Furthermore, in an additional or alternative embodiment, in at least two devices in a given group, the at least one active sensor comprises a structured-light sensor, each of the at least two devices further comprising an active illuminator, the method further comprising:

- detecting, based on the positions and the orientations of the plurality of devices, when fields of view of structured-light sensors of the at least two devices overlap;
- determining one of the at least two devices whose structured-light sensor has a larger field of view than a field of view of a structured-light sensor of another of the at least two devices; and
- when the fields of view of the structured-light sensors of the at least two devices overlap, controlling an active illuminator of the determined one of the at least two devices to project structured light, whilst switching off an active illuminator of the another of the at least two devices and controlling the structured-light sensors of the at least two devices to operate without employing the multiplexing.

Herein, the term "structured-light sensor" refers to an equipment that is operable to sense and/or detect reflections of the structured light off the real-world environment. The structured-light sensor may be an IR-light sensor, a visible-light sensor, a hyperspectral-light sensor, or similar. Moreover, the term "active illuminator" refers to an equipment that, in operation, projects (namely, emits) the structured light onto objects in the real-world environment. The active illuminator may be an IR-light illuminator, a visible-light illuminator, a hyperspectral-light illuminator, or similar. Optionally, a given active illuminator comprises a plurality of light-emitting elements. A given light-emitting element could be a light-emitting diode (LED), a projector, a display, a laser, or similar. The laser may be a vertical-cavity surface-emitting laser (VCSEL).

Since the positions and the orientations of the plurality of devices are already known to the at least one server, the at least one server can accurately detect fields of view of structured-light sensors of which devices in the given group overlap (when the at least two devices in the given group are observing a common region of the real-world environment).

Optionally, when determining the one of the at least two devices whose structured-light sensor has the larger field of view, the at least one server is configured to compare angular extents of the fields of view of structured-light sensors of the at least two devices. In this regard, the larger field of view of the structured-light sensor of the one of the at least two devices covers considerably larger region(s) of the real-world environment as compared to the field of view of the structured-light sensor of the another of the at least two devices. Thus, when the fields of view of the structured-light sensors of the at least two devices overlap, the structured light is more likely to be well-projected by the active illuminator of the determined one of the at least two devices (as the structured-light sensor of the determined one of the at least two devices has considerably larger field of view, and thus a preferable view of the real-world environment for said projection, as compared to the structured-light sensor of the another of the at least two devices). In such a case, the structured-light sensors of the at least two devices would sense the reflections of the structured light simultaneously, without employing the multiplexing. Since only one active illuminator would be controlled at a time to project the structured light for the structured-light sensors of the at least two devices to detect, no interference would occur between the structured-light sensors, and thus no multiplexing is required.

Moreover, optionally, the multiplexing comprises at least one of: time-division multiplexing, wavelength-division multiplexing, space-division multiplexing. The term "time-division multiplexing" refers to a time-based interleaving of at least the active sensors of the devices in the given group, wherein a given active sensor senses reflections of light in a given time period and/or at a given framerate only. The time-division multiplexing could also be employed for an active illuminator of the given device that projects the light in a given time period and/or at a given framerate only. Such an active illuminator may project the light at a full field-of-view at once. Active sensors (such as the ToF sensors) and/or active illuminators that operate by employing the time-division multiplexing are generally suitable for a fixed-wavelength light.

Furthermore, the term "wavelength-division multiplexing" refers to a wavelength-based interleaving of at least the active sensors of the devices in the given group, wherein a given active sensor has a capability to sense different wavelengths of light. When such an active sensor is utilized for the wavelength-division multiplexing, a widest possible wavelength band of light could be used since overlap is known at a high granularity. When a given wavelength of the light is preferred over other wavelengths of the light, a high number of active sensors could be allocated to operate near the given wavelength. The wavelength-division multiplexing could also be employed for an active illuminator of the given device.

The term "space-division multiplexing" refers to a space-based interleaving of at least the active sensors of the devices in the given group, wherein a given active sensor has a capability to control a pattern of the light to be sensed and/or to control an area of a field of view from where the given active sensor is to sense the reflections of the light. The space-division multiplexing could also be employed for an active illuminator of the given device, wherein the active illuminator has a capability to control a pattern of the light to be projected and/or an area of a field of view from where the active illuminator is to project the light. It will be appreciated that the space-division multiplexing enables the active sensors (such as direct-ToF sensors, structured-light sensors) of the devices and active illuminators of the devices to thoroughly scan an entirety of a region in the real-world environment where they are present, without any interference.

In an example, the space-division multiplexing may be employed for a given active sensor (implemented as a stereo RGB sensor), and a given active illuminator (implemented as a laser projector whose path can be individually controlled) of a given device. Herein, the given active illuminator projects the light to a part (namely, an area) of the real-world environment, and the given active sensor senses reflection of the light off the part of the real-world environment. Different parts of the real-world environment can be scanned by using multiple active sensors and active illuminators. Higher the number of devices (each comprising an active sensor and an active illuminator) in the real-world environment, faster is the scanning time.

In another example, each device may comprise a rotating-laser sweeper which sweeps a region of the real-world environment in a form of vertical lines. When multiple devices are present in the same region, for each device, (dynamically-changing) angular slots for sweeping (i.e., scanning) the region may be assigned by the at least one server. For example, a rotating-laser sweeper of a first device sweeps from 0 degree to 16 degrees, a rotating-laser sweeper of a second device sweeps from 16 degrees to 72 degrees, and so on, until 360 degrees are covered. It will be appreciated that the angular slots may change when the (existing) devices move closer to/farther from walls of the region or from each other, or when the devices orient differently relative to each other, or when new devices are employed in the region. Herein, the space-division multiplexing allows for real-time exact angles to be used such that there is no overlap or gaps in sweeping the region.

Notably, the at least one server sends the instructions to at least one of the devices in the given group for controlling the active sensors of the devices to operate by employing the multiplexing. In this regard, the at least one server need not send the instructions to all devices in the given group. In such a case, the at least one server could send the instructions to at least one of the devices which acts as a Bluetooth® master in the given group. Upon receiving the instructions, the Bluetooth® master may send respective instructions to remaining devices of the given group, wherein such remaining devices act as Bluetooth® slaves.

Optionally, the instructions comprise at least one of:

- time slots in which an active illuminator of a given device is to project light,
- time slots in which an active sensor of the given device is to sense reflections of the light,
- a framerate at which the active illuminator of the given device is to project the light,
- a framerate at which the active sensor of the given device is to sense the reflections of the light,
- a wavelength of the light to be projected by the active illuminator of the given device,
- a wavelength of the light to be sensed by the active sensor of the given device,
- a pattern of the light to be projected by the active illuminator of the given device,
- a pattern of the light to be sensed by the active sensor of the given device,
- an area of a field of view on which the active illuminator of the given device is to project the light,
- an area of a field of view from where the active sensor is to sense the reflections of the light.

The term "time slot" refers to a time duration in which the active illuminator is to project the light, or to a time duration in which the active sensor is to sense the reflections of the light. A given time slot comprises a start time and an end time. Further, the term "framerate" refers to a rate of at which the active illuminator of the given device is to project the light (such as a number of illuminations per unit time), or to a rate at which the active sensor of the given device is to sense the reflections of the light (such as a number of illuminations sensed per unit time). It will be appreciated that, for the active illuminator of the given device that is actively illuminating a same region of the real-world environment, time slots and framerates would be same for projecting the light and for sensing the reflections of the light. Optionally, a number of time slots lies in a range of 2 to 32. As an example, the number of time slots may be from 2, 3, 5, 10 or 15 up to 10, 16, 24 or 32. Optionally, a given framerate lies in a range of 5 Hertz to 120 Hertz. As an example, the given framerate may be from 5, 10, 15, 30, 50 or 70 Hertz up to 45, 70, 95 or 120 Hertz.

In an example, two devices X1 and X2 may be present in the real-world environment such that active sensors of the two devices X1 and X2 are to alternately sense reflections of the light in individual time slots of 16 milliseconds each, starting from the active sensor of the device X1 at a time instant T. Herein, in a time slot from T to T+16 milliseconds, the active sensor of the device X1 would sense the reflections; in a time slot from T+16 milliseconds to T+32 milliseconds, the active sensor of the device X2 would sense the reflections; in a time slot from T+32 milliseconds to T+48 milliseconds, the active sensor of the device X1 would sense the reflections, in a time slot from T+48 milliseconds to T+64 milliseconds, the active sensor of the device X2 would sense the reflections; and so on. Framerates at which the active sensors of the devices X1 and X2 are to sense the reflections may be 60 Hertz.

It will be appreciated that the wavelength of the light (to be sensed or to be projected) may be from a low-end IR wavelength to a high-end ultraviolet (UV) wavelength including a visible-light wavelength. In an example, wavelengths of the light to be projected by active illuminators of three devices may be 300 nanometres (i.e., a UV wavelength), 500 nanometres (i.e., a visible-light wavelength), 950 nanometres (i.e., an IR wavelength), respectively.

Furthermore, the pattern of the light (to be sensed or to be projected) optionally comprises a plurality of light spots. In this regard, a density of the plurality of light spots (namely, light dots) could vary spatially across the pattern of light, or could remain same spatially across the pattern of light. The pattern of the light comprising two light spots could be a simplest type of the pattern. Optionally, a shape of the pattern of light is one of: circular, elliptical, polygonal, a freeform shape. Moreover, the shape of the light spots could be one of: circular, elliptical, polygonal, a freeform shape.

For a given device, the area of the field of view (on which the active illuminator of the given device is to project the light, or from where the active sensor is to sense the reflections of the light) could be one of: a circular area, an elliptical area, a polygonal area, a freeform area. For example, the area of the field of view may be a rectangular area (for example, defined using position coordinates from (x0, y0) to (x5, y5)). The area of the field of view could also be defined in a form of an arbitrary per-pixel mask.

The present disclosure also relates to the system as described above. Various embodiments and variants disclosed above apply mutatis mutandis to the system.

Optionally, the at least one server is configured to:

- obtain a three-dimensional environment model of the real-world environment in which the plurality of devices are present;

determine, from the three-dimensional environment model, positions of optical barriers present in the real-world environment; and identify a plurality of segments of the real-world environment that are optically separated from each other, based on the positions of the optical barriers, wherein devices in a given group are present in a corresponding segment of the real-world environment.

Optionally, the at least one server is configured to:

detect when a given device has moved from a first segment to a second segment; and re-classify the given device by shifting the given device from a first group to a second group, wherein the first group and the second group correspond to the first segment and the second segment, respectively.

Optionally, the at least one server is configured to:

detect, based on the positions and the orientations of the plurality of devices, when fields of view of active sensors of at least two devices in a given group do not overlap; and send instructions to at least one of the at least two devices to control the active sensors of the at least two devices to operate without employing the multiplexing, when the fields of view of the active sensors of the at least two devices do not overlap.

Optionally, the at least one server is configured to:

detect, based on the positions and the orientations of the plurality of devices, when the fields of view of the active sensors of the at least two devices in the given group do not overlap, but an angle between orientations of the active sensors of the at least two devices in the given group is smaller than a predefined threshold angle; and send instructions to at least one of the at least two devices to control the active sensors of the at least two devices to operate by employing the multiplexing, when the fields of view of the active sensors of the at least two devices in the given group do not overlap, but the angle between the orientations of the active sensors of the at least two devices is smaller than the predefined threshold angle.

Optionally, in at least two devices in a given group, the at least one active sensor comprises a structured-light sensor, each of the at least two devices further comprising an active illuminator, wherein the at least one server is configured to:

detect, based on the positions and the orientations of the plurality of devices, when fields of view of structured-light sensors of the at least two devices overlap;

determine one of the at least two devices whose structured-light sensor has a larger field of view than a field of view of a structured-light sensor of another of the at least two devices; and when the fields of view of the structured-light sensors of the at least two devices overlap, send instructions to at least one of the at least two devices to control an active illuminator of the determined one of the at least two devices to project structured light, whilst switching off an active illuminator of the another of the at least two devices and controlling the structured-light sensors of the at least two devices to operate without employing the multiplexing.

Optionally, in the system, the multiplexing comprises at least one of: time-division multiplexing, wavelength-division multiplexing, space-division multiplexing.

DETAILED DESCRIPTION OF THE DRAWINGS

Referring to FIG. 1, illustrated is a block diagram of architecture of a system 100 for location and space aware adaptive synchronization, in accordance with an embodiment of the present disclosure. The system 100 comprises at least one server (depicted as a server 102) that is communicably coupled to a plurality of devices (depicted as devices 104 and 106). Each device comprises at least one active sensor (depicted as active sensors 108 and 110 in the devices 104 and 106, respectively).

Figure 2:
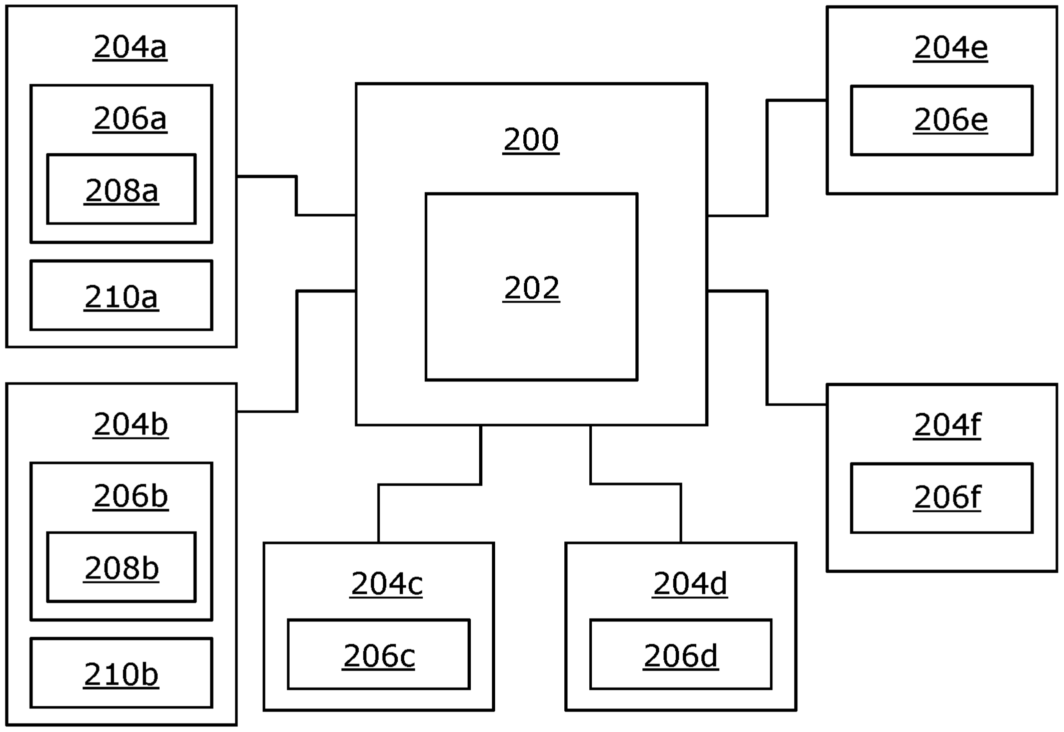

Referring to FIG. 2, illustrated is a block diagram of architecture of a system 200 for location and space aware adaptive synchronization, in accordance with another embodiment of the present disclosure. The system 200 comprises at least one server (depicted as a server 202) that is communicably coupled to a plurality of devices (depicted as devices 204_a_-204_f_). Each device comprises at least one active sensor (depicted as active sensors 206_a_-206_f_ in the devices 204_a_-204_f_, respectively). Now let us consider that the plurality of devices 204_a_-204_f_ are classified into a plurality of groups, such as a first group and a second group, wherein the devices 204_a_-204_c_ belong to the first group, while the devices 204_d_-204_f_ belong to the second group. Optionally, the active sensors 206_a_ and 206_b_ comprise structured-light sensors 208_a_ and 208_b_, respectively. Moreover, optionally, the devices 204_a_ and 204_b_ further comprise active illuminators 210_a_ and 210_b_, respectively.

It may be understood by a person skilled in the art that the FIGS. 1 and 2 include simplified architectures of the systems 100 and 200 for sake of clarity, which should not unduly limit the scope of the claims herein. It is to be understood that the specific implementations of the systems 100 and 200 are provided as examples and are not to be construed as limiting them to specific numbers or types of devices and to specific numbers or types of active sensors in the devices. The person skilled in the art will recognize many variations, alternatives, and modifications of embodiments of the present disclosure.

Figure 3A:
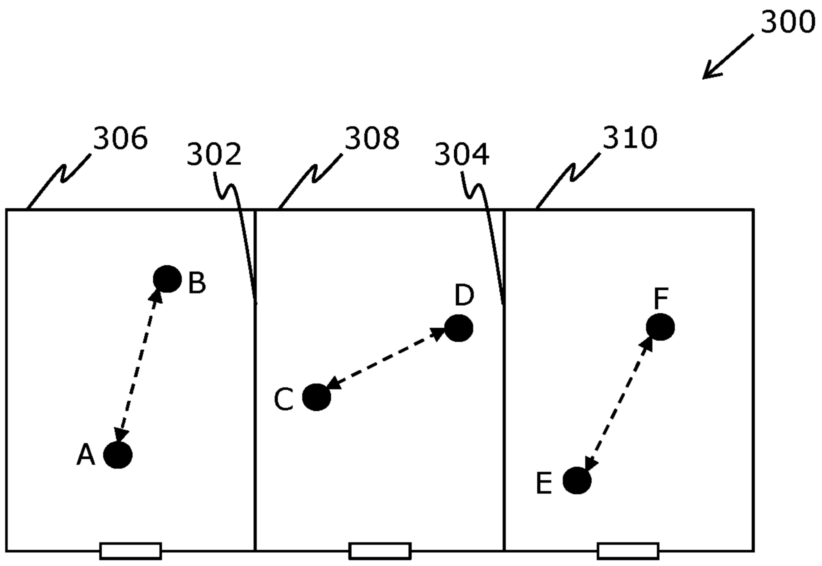
FIGS. 3A and 3B illustrate simplified top views of a real-world environment in which a plurality of devices are present, in accordance with an embodiment of the present disclosure.
Figure 3B:
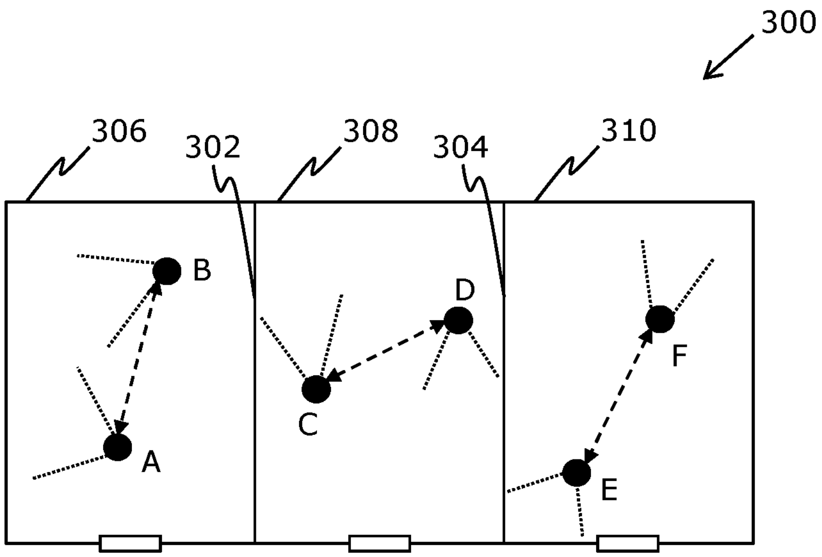

Referring to FIGS. 3A and 3B, illustrated are top views of a real-world environment 300 in which a plurality of devices are present, in accordance with an embodiment of the present disclosure. The real-world environment has optical barriers 302 and 304 present therein. A plurality of segments (depicted as segments 306, 308, and 310) of the real-world environment 300 are identified as optically separated from each other, based on the positions of the optical barriers 302 and 304. Notably, devices in a given group are present in a corresponding segment of the real-world environment. For example, devices A and B in a group are shown to be present in the segment 306, devices C and D in another group are shown to be present in the segment 308, and devices E and F in yet another group are shown to be present in the segment 310.

Consider, for example, that active sensors of the devices A, B, C, D, E and F are capable of operating at 60 Hz at their full performance. As the devices are classified into separate groups, an active sensor of each of the devices A, B, C, D, E and F could be time-multiplexed with an active sensor of another device in its group to operate at 30 Hz (=60/2 Hz). It will be appreciated that without such classification, namely in the prior art, the active sensors of the devices A, B, C, D, E and F would have to operate at 10 Hz (=60/6 Hz).

There is detected, based on tracking of positions and orientations of the devices A-F, when a given device has moved from a first segment to a second segment. Then, the given device is reclassified by shifting the given device from a first group to a second group, wherein the first group and the second group correspond to the first segment and the second segment, respectively. For example, if the device A moves from the segment 306 to the segment 308, such movement is detected and the device A is re-classified by shifting the device A from the group having the devices A and B (i.e., the group corresponding to the segment 306) to the group having the devices C and D (i.e., the group corresponding to the segment 308).

In FIG. 3B, there are also shown fields of view (depicted as spaces bound between a corresponding pair of dotted lines) of the active sensors of the devices A, B, C, D, E and F, respectively. It is detected, based on the positions and the orientations of the plurality of devices, when fields of view of active sensors of at least two devices in a given group do not overlap, and the active sensors of the at least two devices are controlled to operate without employing multiplexing, when the fields of view of the active sensors of the at least two devices do not overlap. For example, the fields of view of active sensors of the devices C and D in a group do not overlap, so the active sensors of the devices C and D are controlled to operate without employing the multiplexing. Similar controlling is performed for active sensors of the devices E and F, as their fields of view also do not overlap. However, active sensors of the devices A and B are controlled to operate by employing multiplexing, as their fields of view overlap. Continuing from the previous example, the active sensors of the devices C, D, E and F could operate at 60 Hz at their full performance, while the active sensors of the devices A and B could be time-multiplexed to operate at 30 Hz.

Figure 4A:
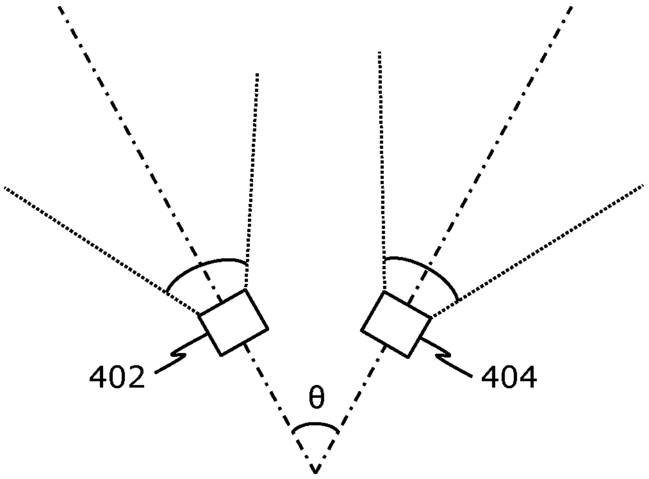
FIGS. 4A and 4B illustrate simplified top views of two devices present in a real-world environment, in accordance with an embodiment of the present disclosure.
Figure 4B:
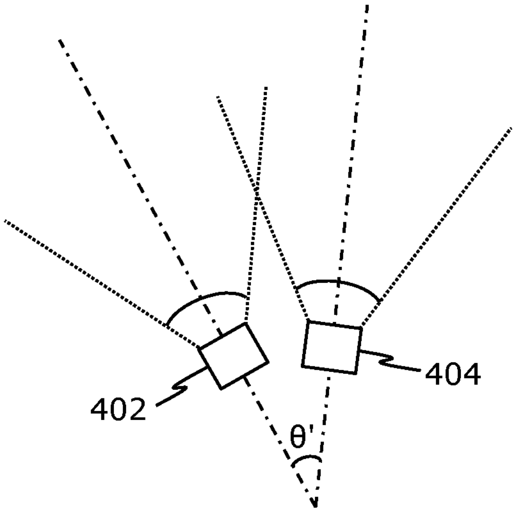

Referring to FIGS. 4A and 4B, illustrated are top views of two devices 402 and 404 present in a real-world environment, in accordance with an embodiment of the present disclosure. The two devices 402 and 404 belong to a group, wherein the group has devices whose active sensors are likely to interfere with each other. There is shown an angle θ between orientations of active sensors of the devices 402 and 404 in the group. In FIG. 4A, positions and orientations of the devices 402 and 404 are shown to be such that fields of view of the active sensors of the devices 402 and 404 do not overlap yet, but the angle θ is smaller than a predefined threshold angle (for example, 30 degrees). In such a case, the active sensors of the devices 402 and 404 are highly likely to interfere with each other when any of the devices 402 and 404 turn towards each other by a certain angle, and thus are controlled to operate by employing multiplexing. In FIG. 4B, the positions and the orientations of the devices 402 and 404 are shown to be such that the fields of view of the active sensors of the devices 402 and 404 overlap, and the angle θ' is smaller than the predefined threshold angle. In such a case, the active sensors of the devices 402 and 404 interfere with each other, and are also controlled to operate by employing multiplexing.

It may be understood by a person skilled in the art that the FIGS. 3A, 3B, 4A, and 4B are merely examples, which should not unduly limit the scope of the claims herein. The person skilled in the art will recognize many variations, alternatives, and modifications of embodiments of the present disclosure.

Figure 5:
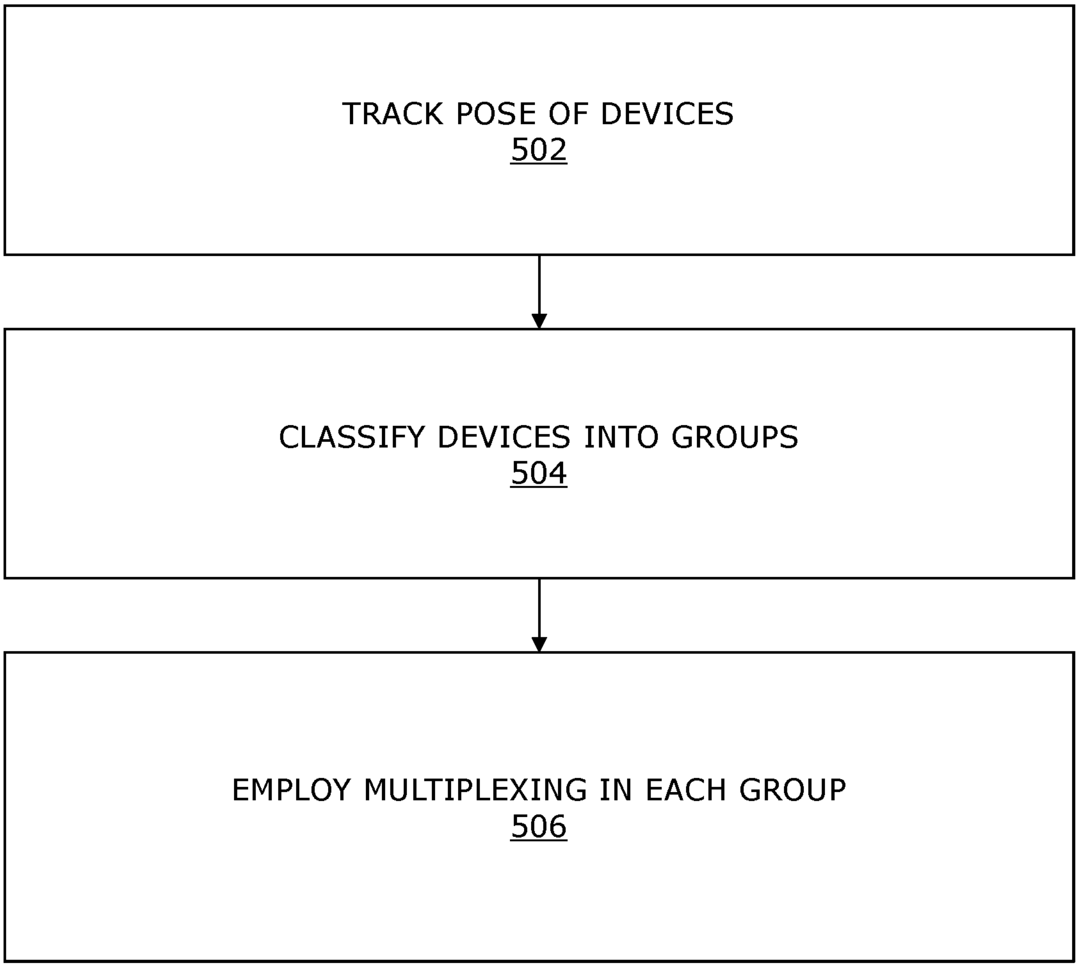
FIG. 5 illustrates steps of a computer-implemented method for location and space aware adaptive synchronization, in accordance with an embodiment of the present disclosure.

Referring to FIG. 5, illustrated are steps of a computer-implemented method for location and space aware adaptive synchronization, in accordance with an embodiment of the present disclosure. At step 502, positions and orientations of a plurality of devices within a real-world environment are tracked, each device comprising at least one active sensor. At step 504, the plurality of devices are classified into a plurality of groups, based on the positions and the orientations of the plurality of devices within the real-world environment, wherein a given group has devices whose active sensors are likely to interfere with each other. At step 506, the active sensors of the devices in the given group are controlled to operate by employing multiplexing.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method comprising:

tracking positions and orientations of a plurality of devices within a real-world environment, each device comprising at least one active sensor;

obtaining a three-dimensional environment model of the real-world environment in which the plurality of devices are present;

determining, from the three-dimensional environment model, positions of optical barriers present in the real-world environment;

identifying a plurality of segments of the real-world environment that are optically separated from each other, based on the positions of the optical barriers;

classifying the plurality of devices into a plurality of groups, based on the positions and the orientations of the plurality of devices within the real-world environment, and based on the identified plurality of segments, wherein devices in a given group are present in a corresponding segment of the real-world environment;

detecting, based on the positions and the orientations of the plurality of devices, whether fields of view of active sensors of at least two devices in the given group overlap;

controlling the active sensors of the at least two devices to operate without employing multiplexing when the fields of view of the active sensors of the at least two devices do not overlap;

controlling the active sensors of the at least two devices in the given group to operate by employing multiplexing when the fields of view of the active sensors of the at least two devices overlap;

detecting, based on said tracking, when a given device has moved from a first segment to a second segment; and re-classifying the given device by shifting the given device from a first group to a second group, wherein the first group and the second group correspond to the first segment and the second segment, respectively;

wherein the classifying of the plurality of devices into the plurality of groups and the controlling of the active sensors are performed dynamically based on the positions and orientations of the plurality of devices as they move within the real-world environment.

2. The computer-implemented method of claim 1, further comprising:

detecting, based on the positions and the orientations of the plurality of devices, when the fields of view of the active sensors of the at least two devices in the given group do not overlap, but an angle between orientations of the active sensors of the at least two devices is smaller than a predefined threshold angle; and controlling the active sensors of the at least two devices to operate by employing multiplexing, when the fields of view of the active sensors of the at least two devices do not overlap, but the angle between the orientations of the active sensors of the at least two devices is smaller than the predefined threshold angle.

3. The computer-implemented method of claim 1, wherein in at least two devices in a given group, the at least one active sensor comprises a structured-light sensor, and each of the at least two devices further comprises an active illuminator, the method further comprising:

detecting, based on the positions and the orientations of the plurality of devices, when fields of view of structured-light sensors of the at least two devices overlap;

determining one of the at least two devices whose structured-light sensor has a larger field of view than a field of view of a structured-light sensor of another of the at least two devices; and when the fields of view of the structured-light sensors of the at least two devices overlap, controlling an active illuminator of the determined one of the at least two devices to project structured light, whilst switching off an active illuminator of another of the at least two devices and controlling the structured-light sensors of the at least two devices to operate without employing the multiplexing.

4. The computer-implemented method of claim 1, further comprising:

monitoring radio packets transmitted by the plurality of devices; and for each device, determining at least one other device that is in a proximity of said device, based on monitoring of at least one radio packet transmitted by the at least one other device, wherein the plurality of devices are classified into the plurality of groups based also on a determination of which devices are in a proximity of each other, and wherein a given radio packet comprises a unique identifier of the given device that transmitted it.

5. The computer-implemented method of claim 4, wherein the radio packets comprise Bluetooth® advertising packets.

6. The computer-implemented method of claim 4, wherein said monitoring of the radio packets comprises measuring a signal strength of a radio packet transmitted by a given device.

7. The computer-implemented method of claim 1, wherein the multiplexing comprises at least one of: time-division multiplexing, wavelength-division multiplexing, space-division multiplexing.

8. A system comprising at least one server that is communicably coupled to a plurality of devices, each device comprising at least one active sensor, wherein the at least one server is configured to:

obtain information indicative of positions and orientations of the plurality of devices within a real-world environment;

obtain a three-dimensional environment model of the real-world environment in which the plurality of devices are present;

determine, from the three-dimensional environment model, positions of optical barriers present in the real-world environment;

identify a plurality of segments of the real-world environment that are optically separated from each other, based on the positions of the optical barriers;

classify the plurality of devices into a plurality of groups, based on the positions and the orientations of the plurality of devices within the real-world environment, and based on the identified plurality of segments, wherein devices in a given group are present in a corresponding segment of the real-world environment;

detect, based on the positions and the orientations of the plurality of devices, whether fields of view of active sensors of at least two devices in the given group overlap;

send instructions to control the active sensors of the at least two devices to operate without employing multiplexing when the fields of view of the active sensors of the at least two devices do not overlap;

send instructions to at least one of the at least two devices to control the active sensors of the at least two devices in the given group to operate by employing multiplexing when the fields of view of the active sensors of the at least two devices overlap;

detect when a given device has moved from a first segment to a second segment; and re-classify the given device by shifting the given device from a first group to a second group, wherein the first group and the second group correspond to the first segment and the second segment, respectively;

wherein the classifying of the plurality of devices into the plurality of groups and the controlling of the active sensors are performed dynamically based on the positions and orientations of the plurality of devices as they move within the real-world environment.

9. The system of claim 8, wherein the at least one server is configured to:

detect, based on the positions and the orientations of the plurality of devices, when the fields of view of the active sensors of the at least two devices in the given group do not overlap, but an angle between orientations of the active sensors of the at least two devices is smaller than a predefined threshold angle; and send instructions to at least one of the at least two devices to control the active sensors of the at least two devices to operate by employing the multiplexing, when the fields of view of the active sensors of the at least two devices do not overlap, but the angle between the orientations of the active sensors of the at least two devices is smaller than the predefined threshold angle.

10. The system of claim 8, wherein, in at least two devices in a given group, the at least one active sensor comprises a structured-light sensor, and each of the at least two devices further comprising an active illuminator, wherein the at least one server is configured to:

detect, based on the positions and the orientations of the plurality of devices, when fields of view of structured-light sensors of the at least two devices overlap;

determine one of the at least two devices whose structured-light sensor has a larger field of view than a field of view of a structured-light sensor of another of the at least two devices; and when the fields of view of the structured-light sensors of the at least two devices overlap, send instructions to at least one of the at least two devices to control an active illuminator of the determined one of the at least two devices to project structured light, whilst switching off an active illuminator of another of the at least two devices and controlling the structured-light sensors of the at least two devices to operate without employing the multiplexing.

11. The system of claim 8, wherein the multiplexing comprises at least one of: time-division multiplexing, wavelength-division multiplexing, space-division multiplexing.

12. The system of claim 8, wherein the instructions comprise at least one of:

time slots in which an active illuminator of a given device is to project light, time slots in which an active sensor of the given device is to sense reflections of the light, a framerate at which the active illuminator of the given device is to project the light, a framerate at which the active sensor of the given device is to sense the reflections of the light, a wavelength of the light to be projected by the active illuminator of the given device, a wavelength of the light to be sensed by the active sensor of the given device, a pattern of the light to be projected by the active illuminator of the given device, a pattern of the light to be sensed by the active sensor of the given device, an area of a field of view on which the active illuminator of the given device is to project the light, an area of a field of view from where the active sensor is to sense the reflections of the light.

* * * * *